Sept. 27, 1966 C. L. COATES, JR., ETAL 3,275,849
BISTABLE DEVICE EMPLOYING THRESHOLD GATE CIRCUITS
Filed Nov. 8, 1963 5 Sheets-Sheet 1

Inventors:
Clarence L. Coates Jr.,
Philip M. Lewis II.,
by John P. DeWitt
Their Attorney.

Inventors:
Clarence L. Coates Jr.,
Philip M. Lewis II.,
by John P. DeWitt
Their Attorney.

BISTABLE DEVICE EMPLOYING THRESHOLD GATE CIRCUITS

Filed Nov. 8, 1963 5 Sheets-Sheet 3

Inventors:
Clarence L. Coates Jr.,
Philip M. Lewis II.,
by John P. DeWitt
Their Attorney.

BISTABLE DEVICE EMPLOYING THRESHOLD GATE CIRCUITS

Filed Nov. 8, 1963

5 Sheets-Sheet 4

Inventors:
Clarence L. Coates Jr.,
Philip M. Lewis II.,
by John P. DeWitt
Their Attorney.

Inventors:
Clarence L. Coates Jr.,
Philip M. Lewis II.,
by John P. Dellitt
Their Attorney.

United States Patent Office 3,275,849

Patented Sept. 27, 1966

3,275,849

BISTABLE DEVICE EMPLOYING THRESHOLD GATE CIRCUITS

Clarence L. Coates, Jr., Austin, Tex., and Philip M. Lewis II, Schenectady, N.Y., assignors to General Electric Company, a corporation of New York Filed Nov. 8, 1963, Ser. No. 322,349
5 Claims. (Cl. 307—88.5)

This invention relates to a bistable device and particularly to such a device including threshold gating elements.

A threshold gating element is a circuit element providing an electrical output when the summation of applied electrical inputs exceeds a predetermined value. Computing devices including threshold elements in logical circuits have the advantage of considerably reducing the number of components required as compared to prior computing circuitry using more conventional "and" "or" logic gating elements, inasmuch as each new input to a threshold gate requires only an extra input resistor. In addition to the logical gating function, a complete computer, however, requires storage, wherein data provided by or for the computer is held until needed. It is a purpose of the present invention to combine the logical and storage functions in a bistable circuit formed of threshold gating elements. This device not only tests the inputs provided thereto on a logical basis by comparison with a predetermined threshold, but remembers or "sets" upon the last input condition.

According to the present invention, a pair of complementing threshold logical elements are cross-coupled whereby one triggers the condition of the other in a bistable manner. Since each logical threshold element is complementing in nature, one logical element of a pair will be energized at any given time. If either gate is in the off or deenergized position, an output is provided which forces the opposite gate into the energized condition.

Generally, similar logical inputs are applied to the two gates of a bistable pair. In accordance with one aspect of the present invention, inputs supplied to one of the gates of a pair may include complements of the inputs supplied to the other gate. Thus the logical criterion for operating only one gate at a time is met by the inputs.

The subject matter which we regard as our invention is clearly pointed out and distinctly claimed in the concluding portion of this specification. The invention, however, both as to organization and method of operation together with further objects and advantages thereof may be best understood by reference to the following description taken in connection with the accompanying drawings wherein like reference characters refer to like elements and in which:

Figure 4:
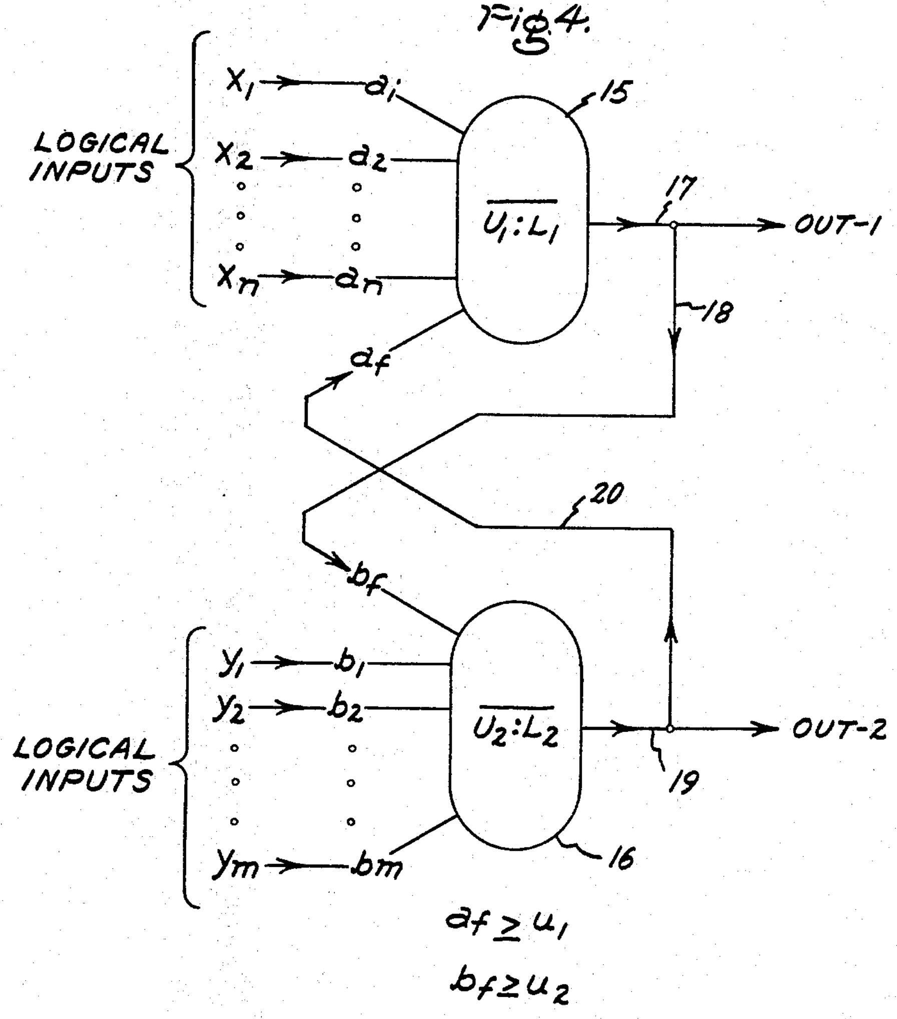
Figure 5:
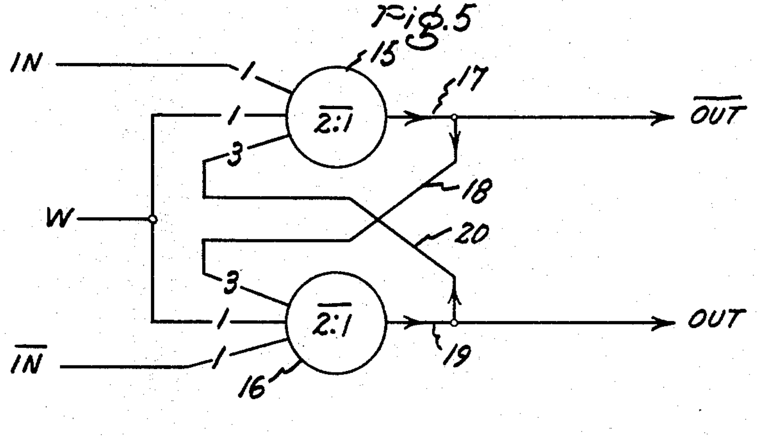
Figure 8:
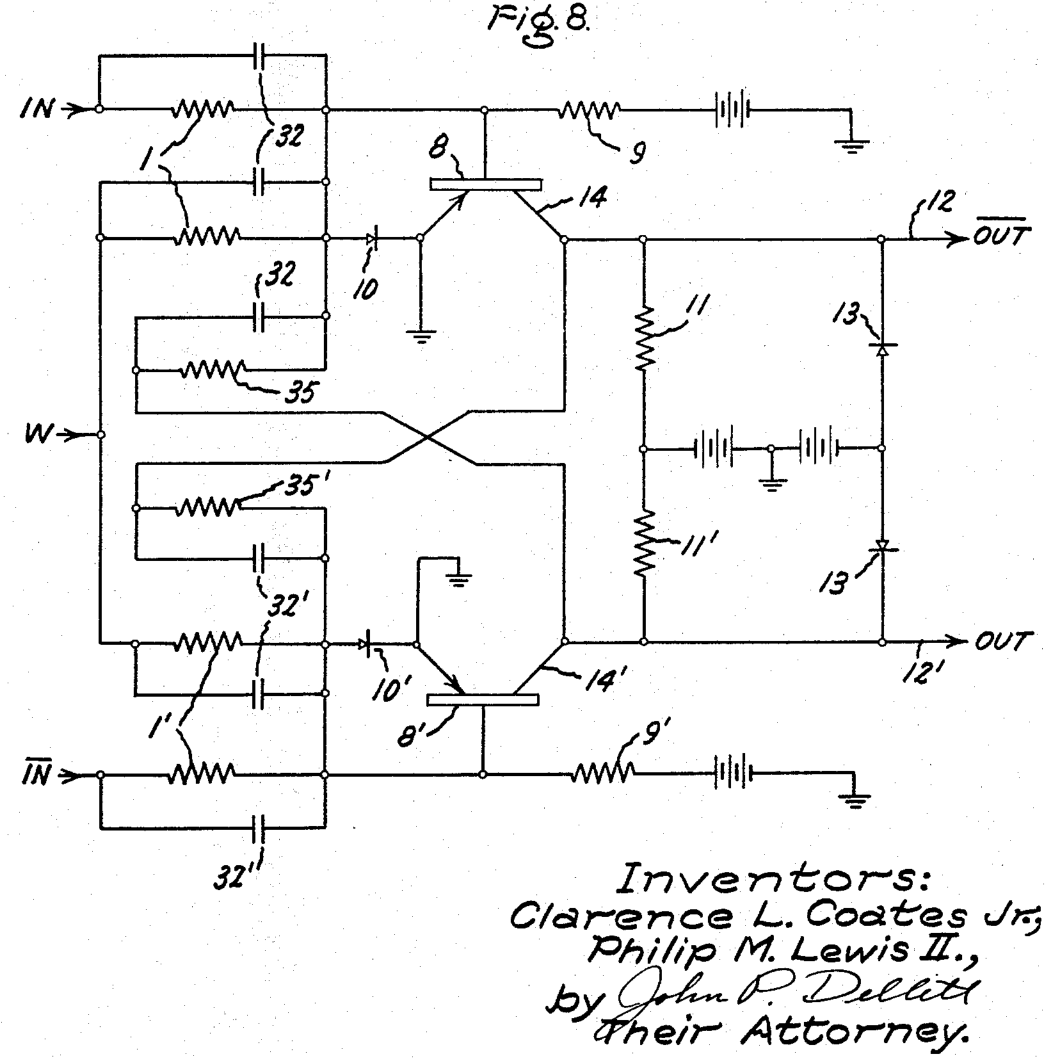
Figure 6:
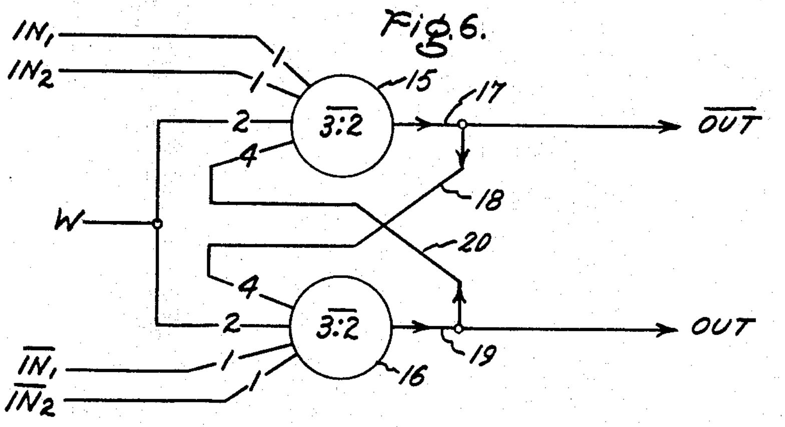
Figure 9:
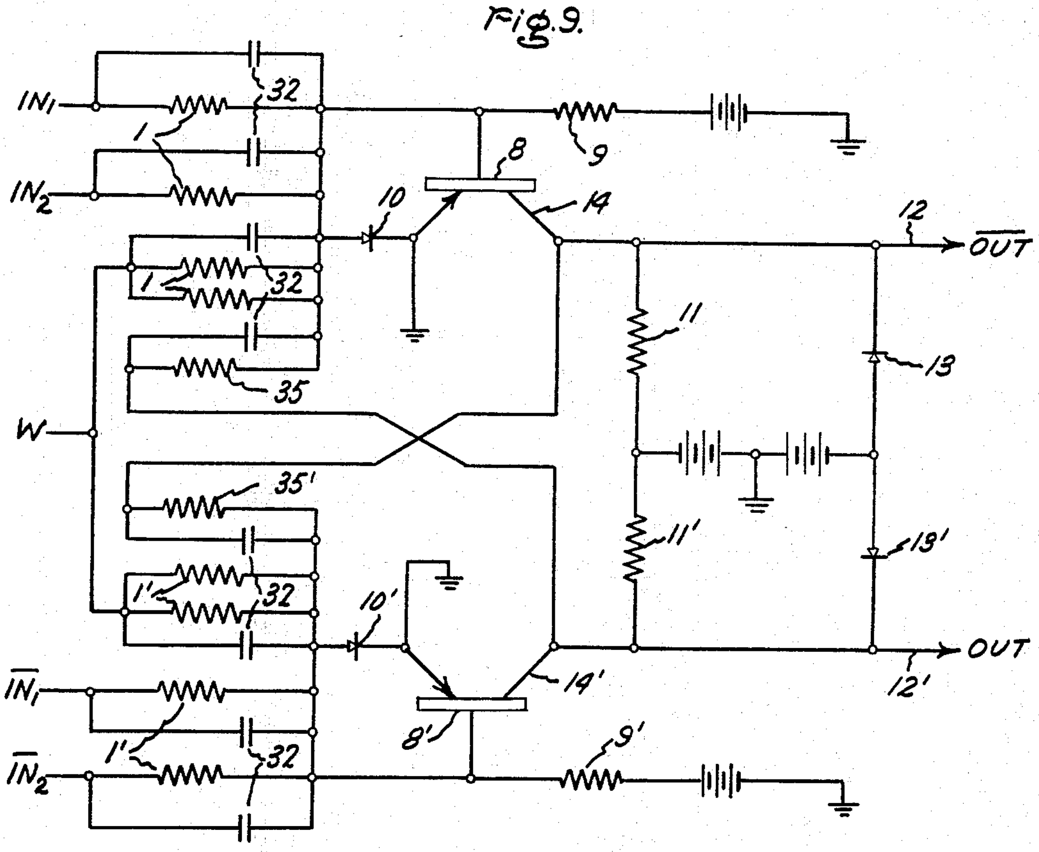
Figure 7:
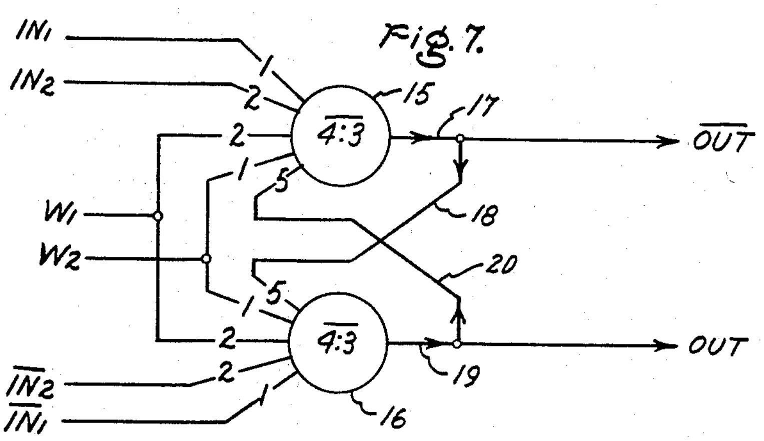
Figure 10:
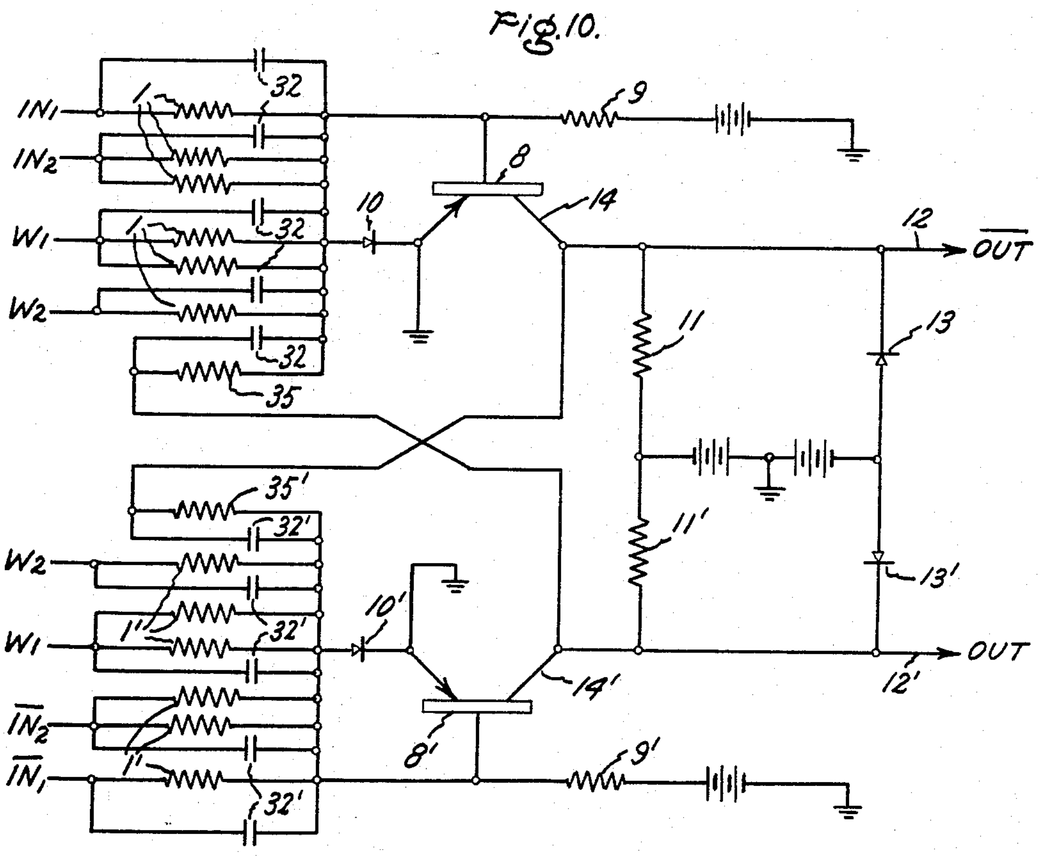

FIG. 4 is a generalized logical diagram of a bistable device in accordance with the present invention, FIG. 5 is a logical diagram of a first exemplary bistable device in accordance with the present invention, FIG. 6 is a logical diagram of a second exemplary device in accordance with the present invention, FIG. 7 is a logical diagram of a third exemplary device in accordance with the present invention, FIG. 8 is a schematic diagram of the FIG. 5 device, FIG. 9 is a schematic diagram of the FIG. 6 device, and FIG. 10 is a schematic diagram of the FIG. 7 device.

Figure 1:
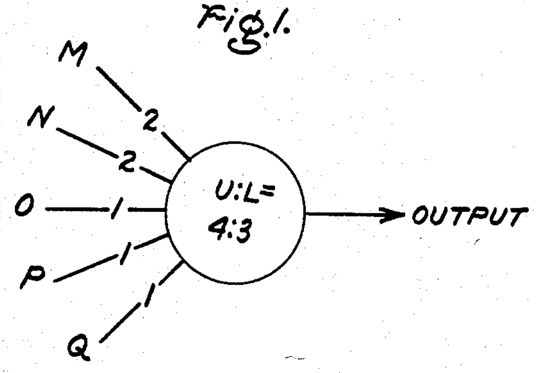
FIG. 1 is a basic representation of a threshold gate element.

A threshold element as utilized in accord with the present invention produces a binary one when a function of its plurality of the indicated binary inputs exceeds a preset threshold value. Such a threshold element or gate may be represented as in FIG. 1 by a circle enclosing a ratio, U:L, of numbers which indicates the threshold "gap." The actual value of threshold is advantageously set to be within this gap. For the threshold element as illustrated in FIG. 1, having a "gap" equalling 4:3, four or more inputs of value one are required to produce an output, but three such inputs produce no output. Weights are given the inputs as indicated by numbers included in the input leads. A weight of two doubles the input so it has the same effect as two inputs of unity weight. Therefore one input of weight two, plus two inputs of weight one, will operate the gate.

In the gap ratio, the first number U, is the smallest value of the summation of weighted inputs, $\Sigma a_i x_i$, for which $\Sigma a_i x_i$ exceeds the gate threshold, and L is the largest value for which $\Sigma a_i x_i$ is below the threshold. In the expression, $\Sigma a_i x_i$, $x_i$ indicates an input in the $i^{th}$ order digit position, and $a_i$ indicates the weight applied to such input. The tolerance or allowable variation in component values (and threshold value) is related to the gap, and can be shown to equal $U-L/U+L$. It is apparent that a smaller gap results in a smaller or tighter tolerance in component values.

FIG. 1 illustrates a straight non-complementing gate.

Figure 2:
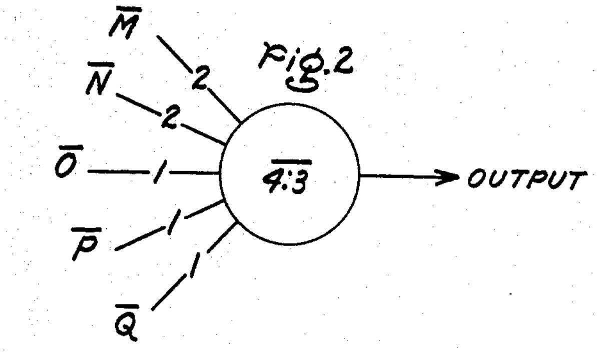
FIG. 2 is a basic representation of a complementing gate element.

FIG. 2 illustrates a complementing gate indicated by the bar over the gap numerals. When the sum of the inputs, $\Sigma a_i x_i$, applied to this gate exceed the threshold, the gates normally-on output is interrupted. Thus an inverse output is produced. In the FIG. 2 illustration, the inputs are also shown as complements. That is, an input signal current is applied to the particular input lead in the absence of the quantity given.

Figure 3:
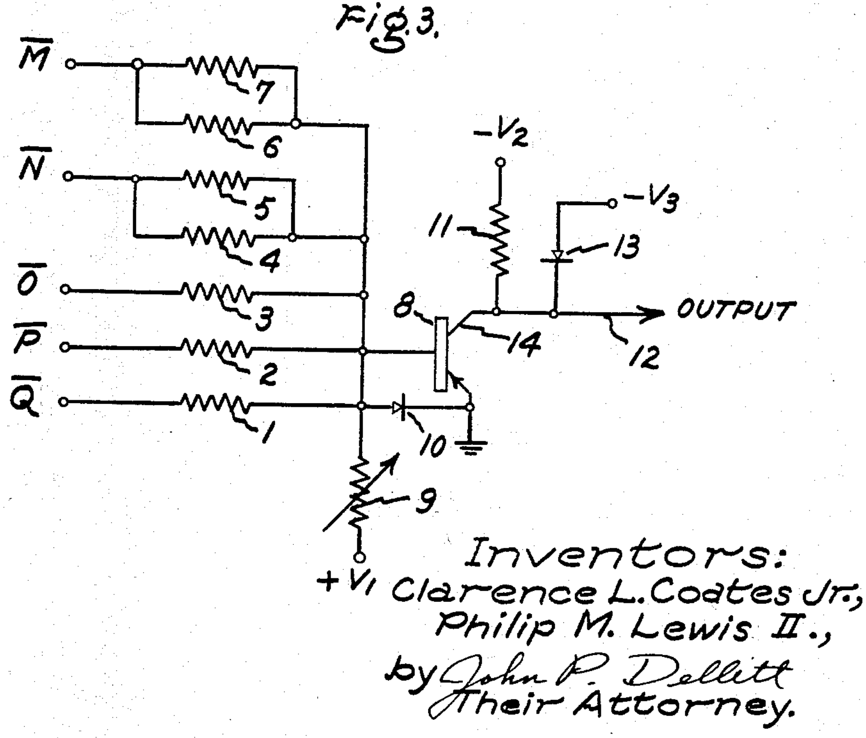
FIG. 3 is a schematic diagram of the threshold element of FIG. 2.

An example of a circuit diagram for a typical threshold gate element is illustrated in FIG. 3. The gate illustrated here is inherently a complementing threshold element; that is, a transistor amplifier connected in this manner produces an inverted output. For illustrative purposes, the FIG. 3 threshold gate is taken as an embodiment of the gate shown schematically in FIG. 2, having the same inputs and input weights.

The circuit illustrated in FIG. 3 produces a negative output voltage, taken as a binary one, when the summation of negative inputs, $\Sigma a_i x_i$, does *not* exceed the threshold setting. "No output," or a binary zero is produced when the summation of negative inputs, $\Sigma a_i x_i$, exceeds the threshold setting. The circuit comprises a transistor amplifier of grounded emitter configuration having a plurality of equal valued input resistors 1–7 connected between the input terminals and the transistor base 8. The input signals are taken as negative going in each instance. The resistors 1–7 have the same resistance, individually providing unit weight to negative polarity inputs applied thereto. Thus resistors 1, 2 and 3 provide unit weight for inputs designated $\overline{O}$, $\overline{P}$ and $\overline{Q}$. However, resistors 4 and 5, connected in parallel, provide double unit weight to input $\overline{N}$, and the parallel combination of resistors 6 and 7 likewise provide double unit weight to $\overline{M}$, since a doubled flow of current may take place through the paralleled resistors in each case.

In the absence of sufficient input for exceeding the threshold, a diode 10 prevents base 8 from rising above ground level, while transistor collector 14, supplied a negative voltage $-V_2$ through resistor 11, is similarly prevented from becoming more negative than a voltage $-V_3$ by means of clamping diode 13. Thus the gate normally supplies a negative output current derived through the diode 13.

A threshold resistor 9, which may be made conveniently variable, couples transistor base 8 to a source of positive voltage $V_1$. This resistor is used to determine the threshold of conduction for the transistor. The threshold resistor 9, jointly with input resistors 1–7, comprise a voltage divider having a midpoint at the transistor base 8. In the absence of the prescribed summation of gate inputs required for exceeding the threshold, the voltage drop across threshold resistor 9 is insufficient to lower the transistor base from ground potential. However, when a number of inputs occur exceeding the preset threshold, these inputs collectively provide sufficient current through their respective input resistors for swinging the transistor base below ground and operate the transistor under saturation conditions. At this time, maximum collector emitter current flows in the transistors establishing a voltage drop across load resistor 11 whereby output terminal 12 rises to a low value near ground level. Thus the output terminal 12 supplies the voltage equalling minus $V_3$ until the threshold is exceeded, at which time the output voltage rises to near zero. This particular circuit is therefore a complementing threshold circuit, as indicated, since an output is produced in the absence of inputs exceeding the gate threshold.

FIG. 4 is a logical diagram of a bistable device according to the present invention including a first complementing threshold gate 15 and a second complementing threshold gate 16 having gaps $\overline{U_1:L_1}$ and $\overline{U_2:L_2}$, respectively. In general it is convenient, but not necessary, for these gaps to be equal. The first complementing threshold element 15 receives a number of logical inputs $x_1, x_2 \ldots x_n$ given respective weights $a_1, a_2 \ldots a_n$. Similarly, gate element 16 receives inputs $y_1, y_2 \ldots y_m$ having weights $b_1, b_2 \ldots b_m$. Since gating element 15 is a complementing gate, an output "1" is produced on output lead 17 if the summation of weighted inputs does not exceed the threshold. An output "0" is produced when they do.

Cross-coupling lead 18 connects output lead 17 as a feedback input to gating element 16, where it receives a weight of $b_f$. Gating element 16, producing an output on lead 19, in the absence of weighted inputs exceeding the gate's threshold, is cross-coupled via feedback lead 20 to an input of gating element 15. This cross-coupled signal receives a weight $a_f$ at gate 15.

The feedback weight $a_f \geqslant U_1$, and $b_f \geqslant U_2$; that is, the feedback signals are weighted in each case to exceed the threshold value. Then if the remaining logical inputs of either gate 15 and 16 produce an output of binary one, occurring when the gate's threshold is *not* exceeded, the feedback connection causes the remaining gate to have an output of zero. Thus the device is bistable and can perform the functions of storage plus logic.

The bistable device will change state if the logical inputs on the gate whose output is 1 are such as to exceed its threshold, while the logical inputs on the other gate do not exceed its threshold. Under these conditions the output of the first gate goes to zero, allowing the output of the other gate to go to 1, which in turn keeps the first gate at zero.

It is frequently desirable for some or all of the logical inputs applied to one threshold gate to be complements of logical inputs applied to the other gate of the pair. Then, if the threshold of one gate is exceeded, the threshold of the other gate is not exceeded, since the presence of a particular input quantity dictates the absence of its complement. In certain instances it is also desirable, but not necessary, that any combination of inputs applied determines the state of the bistable circuit. That is to say, the threshold of one gate or the other will then always be exceeded, as a consistent array of input information is applied to the pair of gates.

Various specific embodiments of the invention are illustrated in FIGS. 5, 6 and 7. In FIG. 5 the inputs, IN and $\overline{\text{IN}}$, are data inputs and W or "write" is denominated a control input for gating data into the bistable device. Gate 15 having a gap, $\overline{2:1}$ receives the signal IN with a weight of 1. Gate 16 also having a gap of $\overline{2:1}$ receives $\overline{\text{IN}}$ with a weight of 1. The control input W is applied to both gates with a weight of 1. Feedback connections 18 and 20 are each given a weight of 3, sufficient for exceeding the threshold of each gate. This heavy weighting, greater than necessary to exceed the threshold, improves the state-changing-time-constant of the circuit.

To store a binary digit "*x*" in the FIG. 5 device, IN is set equal to a binary input value "*x*" which may be zero or one, $\overline{\text{IN}}$ is set equal to "$\bar{x}$," and W is made concurrently equal to 1. Then the quantity "*x*" is entered into the device for storage therein. The state of the bistable device is not affected either if W is equal to zero, or if W is equal to 1 and IN and $\overline{\text{IN}}$ are *both* equal to zero. The operation of the circuit of FIG. 5 can then be characterized by the Boolean expression: W·IN, that is W "and" IN. Thus, the quantity W, in combination with the input, IN, gates the input signal, from IN, into the bistable device, or "sets" this input signal into the device.

In FIG. 6, W is again the control input, and $\text{IN}_1$, $\text{IN}_2$, $\overline{\text{IN}_1}$ and $\overline{\text{IN}_2}$ are data inputs. As long as $W=0$, the data inputs can have any value without setting the bistable device. Data can be stored in the device either from inputs $\text{IN}_1$ and $\overline{\text{IN}_1}$ or from $\text{IN}_2$ and $\overline{\text{IN}_2}$. For example, if $\text{IN}_1$ and $\overline{\text{IN}_1}$ are both equal to zero while $\overline{IN_2}$="$x$," $IN_2$="$x$," and simultaneously $W=1$, the binary digit "$x$" will be stored as a bistable set of the device. The operation of the circuit of FIG. 6 may be characterized by the Boolean expression: $W(IN_1 \dotplus IN_2)$, wherein $\dotplus$ stands for the logical operation "or."

In the FIG. 7 circuits, somewhat more complex threshold logic is performed at the input of the bistable device. Here, $\text{IN}_1$, $\text{IN}_2$, $\overline{\text{IN}_1}$ and $\overline{\text{IN}_2}$ are data inputs and $W_1$ and $W_2$ are control inputs. If $W_1$ and $W_2$ are both zero then the data inputs can have any value without setting the bistable circuit. However data can be stored from either $\text{IN}_1$ and $\overline{\text{IN}_1}$ or from $\text{IN}_2$ and $\overline{\text{IN}_2}$. To store data from $\text{IN}_1$ and $\overline{\text{IN}_1}$, $W_1$ is set equal to one, and $W_2$ is set equal to one, while $\text{IN}_2$ and $\overline{\text{IN}_2}$ are set equal to zero. Then signal inputs, $IN_1$="$x$" and $\overline{IN_1}$="$\bar{x}$," will be set into the bistable circuit. To store data from $\text{IN}_2$ and $\overline{\text{IN}_2}$, $W_1$ is set equal to one, and $W_2$ is set equal to zero, while $IN_2$="$x$," $\overline{IN_2}$="$\bar{x}$." In the latter instance $\text{IN}_1$ and $\overline{\text{IN}_1}$ can have any arbitrary values. The operation of the FIG. 7 device may be described by the Boolean expression $W_1IN_2 \dotplus (W_1 \dotplus IN_2)W_2IN_1$.

FIGS. 8, 9 and 10 are complete schematic diagrams of bistable devices of FIGS. 5, 6 and 7, respectively. Since the circuit details are variations upon the circuit illustrated and described in connection with FIG. 3, these circuits will not be completely redescribed. Like reference numbers refer to like components, with the principal changes being herein noted. The primed numbers are applied to components of the second gate of the pair, or the gate receiving complemented inputs. Input resistors 1 determine by their paralleled resistances the weight given the various inputs. In some cases resistors are shunted employing capacitors 32 in order to improve the rise-time response of an input circuit. Each feedback connection includes a resistor 35 having an appropriate fraction of the resistor 1 value in order to give the feedback the proper specified weight. Thus in FIG. 8, resistors 35 will have a resistance approximately one-third that of resistor 1 while in the circuit of FIG. 9, the feedback resistors 35 have a resistance one-fourth that of resistor 1. In FIG. 10, feedback resistors are one-fifth the resistor 1 value.

Bistable devices in accordance with the present invention are applicable to form registers for storing a complete binary number, from a binary digit of a low order to that of a higher order digit position. These bistable devices are also applicable in more complex circuits, for example, the adding accumulator set forth and claimed in our copending application Serial Number 322,285, filed November 8, 1963 and entitled Accumulator. In the adding accumulator, an input number is added in parallel to the number stored in the accumulator, after which the resultant is placed in storage. The accumulator storage is changed only to the extent the digits of the new sum differ from those previously stored. Control inputs applied to the accumulator cause the accumulator to provide other functions, e.g. those of complementing, and shifting along the register.

While we have shown and described several embodiments of our invention, it will be apparent to those skilled in the art that many changes and modifications may be made without departing from our invention in its broader aspects; and we therefore intend the appended claims to cover all such changes and modifications as fall within the true spirit and scope of our invention.

What we claim as new and desire to secure by Letters Patent of the United States is:

1. A bistable device comprising a pair of complementary threshold gates, each said gate having a plurality of inputs and generating an inverted output signal when the summation of input signals applied thereto exceeds a predetermined threshold value, cross-connections coupling the output of a first said threshold gate as an input to a second gate as well as coupling the output of said second gate as an input to said first gate, and means to provide the cross-connected inputs with weights respectively sufficient by themselves to supply signals which exceed the threshold value of said gates, and means coupling a single input to each of said gates in parallel so that energization of said single input concurrently with another input to said first gate results in producing a binary zero output signal from said first gate and a binary one output signal from said second gate.

2. A bistable device comprising a pair of complementary threshold gates, each said gate having a plurality of input connections and generating an inverted output signal when the summation of input signals applied thereto exceeds a predetermined threshold value, a cross-connection coupling the output of a first said threshold gate to provide an input to the other gate, a cross-connection coupling the output of said other gate to provide an input to said first gate, means to provide the cross-coupled inputs with weights respectively sufficient by themselves to supply signals which exceed the threshold value of said gates to render the device bistable whereby one gate of the pair provides an output signal, and means coupling complementary input signals to said gates so that the bistable device will change its stable state when the input signals on the gate initially providing an output signal are jointly such as to exceed the threshold value of said gate initially providing an output while the input signals on the remaining gate are jointly such as not to exceed the threshold value of said remaining gate.

3. A bistable device comprising a first binary threshold gate and a second binary threshold gate, each said gate including a plurality of inputs and providing an output signal when the summation of input signal values applied thereto exceeds a predetermined threshold value, first means coupling the output of said first gate as an input of the second gate, second means coupling the output of the second gate as an input of the first gate, and means providing control signals to both said gates in conjunction with input signal values to exceed the threshold value of said first gate for entering a function of input signal into said device, said first and second means applying a weight to said first and second gate outputs respectively sufficient to exceed the threshold value of said second and first gates, but the remaining input values being individually insufficient for exceeding the threshold value of said gates.

4. A bistable device comprising a first threshold gate and a second threshold gate, each said gate including plural logic input connections, means providing differing weights to said logic input connections, means providing further input connections to said gates for supplying control signal inputs coincident with said logic signal inputs to operate said gates to provide an output when the summation of weighted signal inputs exceeds a predetermined threshold value, first means coupling the output of the first gate to an input connection of the second gate, and second means coupling the output of the second gate to an input connection of the first gate, the weighted input signal provided by either said first or second means being sufficient to exceed the threshold value of said second or first gate respectively, but the other of said signals applied to input connections of each gate being insufficient to singly exceed the threshold value thereof.

5. A bistable device comprising a first complementing threshold gate and a second complementing threshold gate, each said gate including logic input connections, means providing differing input weights to said input connections, means providing control input signals identically to each of said gates for operating said gates to provide an output when the summation of weighted input signals exceeds a predetermined threshold value, the threshold value being the same for each of said gates, first means coupling the output of said first gate as one of the inputs of the second gate, and second means coupling the output of the second gate as one of the inputs of the first gate, the weighted input signal provided by either said first or second means being sufficient to exceed the threshold value of said second or first gate respectively, but the other of said signals applied to input connections of each gate being insufficient to singly exceed the threshold value thereof.

References Cited by the Examiner

UNITED STATES PATENTS

| | | |
|---|---|---|
| 2,985,773 | 5/1961 | Dobbie. |
| 3,040,187 | 6/1962 | Dobbie. |
| 3,052,801 | 9/1962 | Kaufman et al. |
| 3,078,376 | 2/1963 | Lewin. |
| 3,093,751 | 6/1963 | Williamson. |
| 3,104,327 | 9/1963 | Rowe. |
| 3,110,821 | 11/1963 | Webb. |
| 3,153,200 | 10/1964 | Wahrmen et al. |
| 3,173,028 | 3/1965 | Philips et al. |
| 3,178,590 | 4/1965 | Heilweil. |

OTHER REFERENCES

Hurley: Junction Transistor Electronics, Wiley & Sons, 1958, pp. 390–398.

Rowe: The Transistor NOR Circuit, 1957 I.R.E. Wescon Record, Part 4, Aug. 23, 1957, pp. 231–245.

Mathias: Static Switching Devices, Control Engineering, May, 1957, p. 82 relied on.

Wolman et al.: Universal Boards Cut Computer Lead Time, Electronics, July 15, 1960, vol. 33, No. 29, p. 90.

ARTHUR GAUSS, *Primary Examiner.*

I. C. EDELL, *Assistant Examiner.*